(12) United States Patent
Porte et al.

(10) Patent No.: US 11,945,596 B2
(45) Date of Patent: Apr. 2, 2024

(54) METHOD FOR PRODUCING AN ALVEOLAR SOUNDPROOFING STRUCTURE INCLUDING A DIAPHRAGM, AND ALVEOLAR SOUNDPROOFING STRUCTURE OBTAINED

(71) Applicant: Airbus Operations SAS, Toulouse (FR)

(72) Inventors: Alain Porte, Toulouse (FR); Jacques Lalane, Toulouse (FR); Florian Ravise, Toulouse (FR); Franck Dobigeon, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 329 days.

(21) Appl. No.: 17/330,598

(22) Filed: May 26, 2021

(65) Prior Publication Data

US 2021/0371118 A1    Dec. 2, 2021

(30) Foreign Application Priority Data

May 29, 2020    (FR) ...................................... 2005676

(51) Int. Cl.
*B64D 29/00*    (2006.01)
*B29C 65/00*    (2006.01)
(Continued)

(52) U.S. Cl.
CPC .............. *B64D 29/00* (2013.01); *B29C 65/48* (2013.01); *B29C 66/30325* (2013.01);
(Continued)

(58) Field of Classification Search
CPC .............................. B64D 29/00; B64D 33/02; B64D 2033/0206; B64D 2033/0286;
(Continued)

(56) References Cited

U.S. PATENT DOCUMENTS 6,615,950 B2 *    9/2003    Porte .................... G10K 11/172
181/290
7,857,093 B2    12/2010    Sternberger et al.
(Continued)

FOREIGN PATENT DOCUMENTS

FR    3055662 A1    3/2018
GB    2005384 A    4/1979

OTHER PUBLICATIONS

French Search Report; priority document.

*Primary Examiner* — Shawki S Ismail
*Assistant Examiner* — Jennifer B. Olson
(74) *Attorney, Agent, or Firm* — Greer, Burns & Crain, Ltd.

(57) ABSTRACT

A method for producing an alveolar soundproofing structure in which a portion of a membrane of a diaphragm including an acoustic outlet is inserted into a hole of a perforated membrane which covers a cell of the alveolar structure, and the diaphragm is pressed into the cell with the perforated membrane becoming deformed and is fixed at that location. It also relates to the alveolar structure. Such a method enables different types of diaphragms to be inserted into different configurations of cells and enables the diaphragm to be fixed therein, in accordance with the sound frequencies to be processed.

11 Claims, 4 Drawing Sheets

(51) Int. Cl.
  *B29C 65/48* (2006.01)
  *B29L 31/30* (2006.01)
  *B64D 33/02* (2006.01)
  *G10K 11/162* (2006.01)
  *G10K 13/00* (2006.01)

(52) U.S. Cl.
  CPC ............ *B29C 66/47* (2013.01); *G10K 11/162* (2013.01); *G10K 13/00* (2013.01); *B29K 2995/0002* (2013.01); *B29L 2031/3076* (2013.01)

(58) Field of Classification Search
  CPC ... B64D 29/02; B29C 65/48; B29C 66/30325; B29C 66/47; G10K 11/162; G10K 13/00; G10K 11/172; B29K 2995/0002; B29K 2995/0001; B29L 2031/3076; B64F 5/00; B64F 5/10; B32B 2307/102; B32B 2307/554; B32B 2605/18; B32B 3/08; B32B 3/12; B32B 3/266; B32B 7/12; B64C 1/40; F02K 1/827; F02C 7/045; F02C 7/24
  USPC .................................................. 181/222, 292
  See application file for complete search history.

(56) References Cited

U.S. PATENT DOCUMENTS

| | | | |
|---|---|---|---|
| 9,607,598 B2* | 3/2017 | Leon | B32B 3/12 |
| 9,620,102 B1* | 4/2017 | Ichihashi | F02C 7/045 |
| 9,693,166 B2* | 6/2017 | Herrera | B32B 37/22 |
| 9,931,825 B2* | 4/2018 | Gerken | B32B 41/00 |
| 10,280,839 B2* | 5/2019 | Riou | F02C 7/045 |
| 2015/0041248 A1 | 2/2015 | Ichihashi | |

* cited by examiner

METHOD FOR PRODUCING AN ALVEOLAR SOUNDPROOFING STRUCTURE INCLUDING A DIAPHRAGM, AND ALVEOLAR SOUNDPROOFING STRUCTURE OBTAINED

CROSS-REFERENCES TO RELATED APPLICATIONS

This application claims the benefit of the French patent application No. 2005676 filed on May 29, 2020, the entire disclosures of which are incorporated herein by way of reference.

FIELD OF THE INVENTION

The present invention relates to a method for producing an alveolar structure and, more particularly, an alveolar soundproofing structure. It also relates to the alveolar soundproofing structure.

BACKGROUND OF THE INVENTION

The alveolar structure may have different applications, in particular in the aeronautical field, for example, in a nacelle of an aircraft.

An alveolar structure refers, in this instance, to a structure which comprises recesses or cells, that is to say, unitary hollow spaces which are juxtaposed.

Such a structure may be produced from various materials, for example, plastics materials, composite or metal materials. The cells may have various geometries. A well-known form of alveolar structure has cells in the form of a right prism with a hexagonal base. The term "honeycomb" structure is often used to refer to this type of structure with hexagonal cells, but this expression is sometimes misused to refer to alveolar panels which have any other forms of cells.

Such a structure may be used in numerous technical fields, in particular in the aeronautical field.

For example, an aircraft propulsion assembly nacelle generally comprises an air inlet which is an acoustic structure which has to ensure sound processing of a front portion of the nacelle and absorb any noise disruptions which may originate from an engine propeller.

The air inlet conventionally comprises an acoustic panel which principally ensures the sound processing and a large proportion of an internal aerodynamic behavior of the air inlet.

The acoustic panel may be made of composite materials and produced in one piece. The entire inner surface thereof may ensure the acoustic processing.

In this context, the acoustic panel may be sized to withstand various stresses, such as, for example, a loss of a propeller blade, an aerodynamic loading (overpressure) over an entire internal perimeter of the acoustic panel, bird strike, various thermal stresses, etc.

To this end, at least a portion of the acoustic panel conventionally comprises a core with an alveolar structure (incorrectly referred to as a "honeycomb") which is configured to damp noise disruptions and which is interposed between an acoustic skin ("resistive skin") which forms a first face and a structural rear skin ("backing skin") which forms a second face of the acoustic panel.

An objective of the acoustic skin is to allow noise to pass. It is, for example, composed of several layers, including one porous layer which often has holes.

The structural rear skin is particularly intended to act as a sound reflector and to be heavily involved in the structural strength of the acoustic panel.

By adjusting a thickness of the acoustic panel, it is possible to attenuate high or low frequencies: the thicker the panel is, the lower the reduced frequencies are.

Propulsion assemblies sometimes use a motor with a high bypass ratio which, for an identical level of thrust, has wider and shorter dimensions, fan blades with larger dimensions being able to be associated with lower rotation speeds than a traditional motor. The frequencies to be reduced are thus lower.

The acoustic panels known from the prior art are generally efficient only to within a narrow range of dominant frequencies of this type of motor.

In order to attenuate frequencies over a larger range, the patent

U.S. Pat. No. 7,857,093 B2 proposes, for example, superimposing two layers of honeycombs in order to absorb lower frequencies.

However, such a solution effectively results in a greater spatial requirement. A thickness of the acoustic panel is increased significantly, resulting in an increase of mass and rigidity of the acoustic panel.

Furthermore, the cells of an alveolar structure can vary significantly, in particular in terms of cross section shape and dimensions, from one alveolar structure to another.

In this context, one objective is to provide a method for producing an acoustic panel, formed from at least one alveolar structure which can be adapted to various alveolar shapes.

To this end, there is proposed, according to a first aspect, a method for producing an alveolar soundproofing structure comprising:

a step of providing an alveolar structure which comprises at least one cell which has a basic cross section S of any shape and a height H, and a perforated membrane which comprises at least one hole, the perforated membrane being arranged at a first side of the alveolar structure, covering at least the cell, and the hole opening into the cell;

a step of providing a diaphragm, comprising a membrane which comprises at least one acoustic outlet;

a step of inserting a portion of the membrane including the acoustic outlet into the hole of the perforated membrane and a step of pressing the diaphragm into the cell with the perforated membrane becoming deformed; and a step of fixing the diaphragm to the perforated membrane.

Such a method enables different types of diaphragms to be inserted into different cell configurations and enables the diaphragm to be fixed therein.

This is because the cells of an alveolar structure can vary significantly, particularly in terms of cross section shape and dimensions, from one alveolar structure to another. In a parallel manner, the diaphragm to be inserted may also vary in accordance with the sound frequencies to be processed and the alveolar structure for which it is intended. In this context, such a method for producing an alveolar soundproofing structure, formed from at least one alveolar structure, into at least one cell of which a diaphragm is inserted, can be adapted to various shapes of cells and diaphragms.

A connection between the diaphragm and the cell is carried out via the perforated membrane which may be an adhesive element.

The acoustic outlet is a portion of the diaphragm which is configured to transmit sound waves. The acoustic outlet is, for example, formed by at least one hole or micro-perforations, or a weave.

The diaphragm is, for example, arranged in the cell in accordance with the frequencies to be processed, that is to say, with the acoustic outlet at a predetermined distance p from a basic cross section of the cell.

The diaphragm thus divides the cell into two compartments which communicate with each other, at least acoustically, only via the acoustic outlet of the membrane. In this manner, from the selected basic alveolar structure (that is to say, initially without any diaphragm), which may even be standard and which is provided with a perforated membrane on one face, the diaphragm is arranged in the cell by means of deformation of the membrane and arranged in the cell in accordance with the frequencies to be processed, that is to say, at a predetermined distance from a basic cross section of the cell.

It is thus possible to process different frequency ranges with the same alveolar basic structure and the same diaphragm, in accordance with the arrangement of the diaphragm in the cell of the alveolar structure.

For example, the cell is a monobloc cell.

The cell may be produced from synthetic material, from paper or woven material covered or coated with resin or another product which improves the rigidity and the impermeability, from composite material, for example, thermoplastic material, or metal, or another material in accordance with the application intended.

The cell is, for example, formed by a right cylinder, that is to say, whose generator is orthogonal to the basic cross section.

The shape of the basic cross section of the cell may vary. This is, for example, determined in accordance with the mechanical features desired for the alveolar soundproofing structure.

For example, the basic cross section of the cell has a circular or hexagonal shape. In the case of a hexagonal cell, the alveolar structure then corresponds to a honeycomb structure, strictly speaking.

Where applicable, the basic alveolar structure is selected in accordance with the volumes of the compartments desired, for example, by varying the height of the alveolar structure.

According to an embodiment, the method comprises:

a step of taking the diaphragm using an insertion tool comprising a step of drawing in a portion of the diaphragm using the insertion tool.

According to an embodiment, the method comprises:

a step of releasing the diaphragm using the insertion tool comprising a step of stopping the drawing of the portion of the diaphragm using the insertion tool.

According to an embodiment, the step of inserting a portion of the membrane including the acoustic outlet into the hole of the perforated membrane is carried out by maintaining the drawing action using the insertion tool.

According to an embodiment, the step of pressing the diaphragm into the cell while deforming the perforated membrane is carried out by maintaining the drawing action using the insertion tool.

According to an embodiment, the method comprises a step of applying a resistive sheet at the first side of the alveolar structure, above the perforated membrane, after the step of pressing the diaphragm into the cell while deforming the perforated membrane.

According to an embodiment, the method comprises a step of applying a closure sheet at a second side of the alveolar structure.

There is also proposed, according to another aspect, an alveolar soundproofing structure comprising:

an alveolar structure which comprises at least one cell which has a basic cross section S of any form and a height H, and a perforated membrane which covers the cell at a first side and which comprises at least one hole which opens into the cell, a diaphragm which comprises a membrane which has at least one acoustic outlet, at least one portion of the membrane including the acoustic outlet being inserted into the hole of the perforated membrane and the diaphragm being pressed into the cell, the membrane of the diaphragm being pressed against and fixed to the perforated membrane.

Such an alveolar structure thus has advantages similar to those mentioned above.

For example, the alveolar soundproofing structure comprises a resistive sheet at the first side of the alveolar structure, above the perforated membrane, the diaphragm being held in the cell at least partially between the perforated membrane and the resistive sheet.

For example, the alveolar soundproofing structure comprises a closure sheet at a second side of the alveolar structure.

There is also proposed an aircraft nacelle which comprises an air inlet which comprises an acoustic panel.

For example, the acoustic panel comprises an alveolar structure as described above.

For example, an acoustic skin of the acoustic panel comprises the resistive sheet of the alveolar structure.

For example, a rear skin of the acoustic panel which is configured to ensure the structural strength of the acoustic panel comprises the closure sheet of the alveolar structure.

There is finally proposed an aircraft which comprises at least one propulsion assembly which comprises a nacelle as described above.

BRIEF DESCRIPTION OF THE DRAWINGS

The invention, according to an embodiment, will be clearly understood and the advantages thereof will be better appreciated from a reading of the following detailed description, given purely by way of non-limiting example, with reference to the appended drawings, in which.

DETAILED DESCRIPTION OF THE PREFERRED EMBODIMENTS

Figure 1:
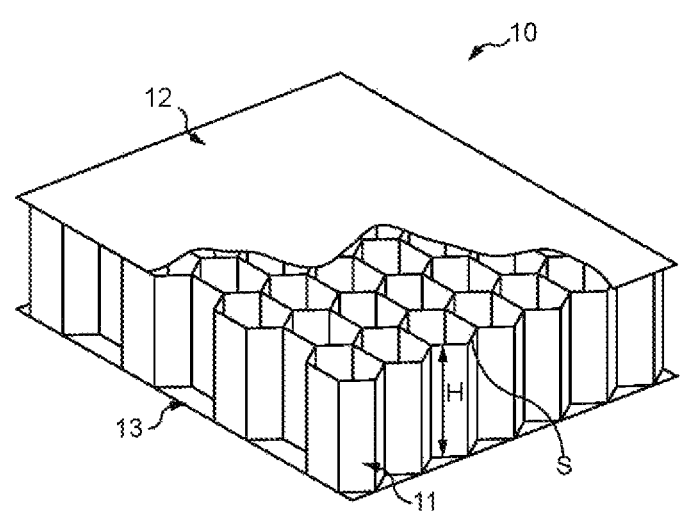
FIG. 1 is a schematic, perspective view of an alveolar soundproofing structure.

FIG. 1 is a schematic illustration of a conventional or basic alveolar soundproofing structure 10.

It comprises cells (also referred to as recesses or cavities) 11 which are juxtaposed with respect to each other in two mutually orthogonal directions. A third direction, which is orthogonal to the two preceding ones, corresponds to a thickness of the alveolar structure, also defined by a height H of the cells 11.

In the example illustrated in FIG. 1, the alveolar structure is provided, at a first side of the alveolar structure, with a resistive sheet 12 which covers the cells 11. The resistive sheet 12 is optionally perforated. It forms a resistive surface which enables the cells 11 to communicate with an external environment. At a second side of the alveolar structure, the alveolar structure is provided with a closure sheet (rear skin) 13 which closes the cells 11.

The closure sheet 13 may be a solid sheet. Nonetheless, it may be a sheet which has perforations. A solid sheet is generally used for simple acoustic processing operations, referred to as SDOF ("Single Degree of Freedom") and forms a rear skin which is configured to reflect sound waves. A perforated closure sheet is generally used for acoustic processing operations which are referred to as DDOF ("Double Degree of Freedom") and for which a stack of two levels of a honeycomb is produced, the levels being separated by a porous intermediate skin formed by the closure sheet 13.

In FIG. 1, in order to better show the alveolar structure, the sheet or resistive layer 12 is illustrated in a manner covering only some of the cells 11. The cells 11 of the alveolar structure 10 illustrated in this instance are referred to as being hexagonal, the volume thereof is that of a right cylinder, having a hexagonal basic cross section S which extends between the resistive sheet 12 and the closure sheet 13 over the height H.

The cells are further arranged in a staggered manner, being imbricated with respect to each other without defining a dead space in this instance.

Figure 2:
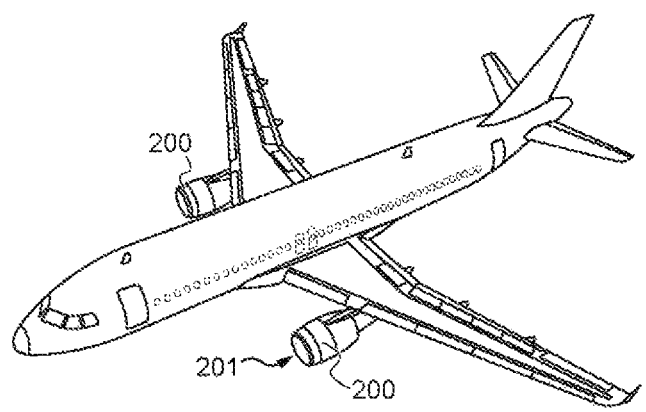
FIG. 2 is a perspective view of an aircraft comprising a nacelle having an air inlet.

FIG. 2 shows a twin jet aircraft having two nacelles 200 which have an air inlet 201.

Figure 3:
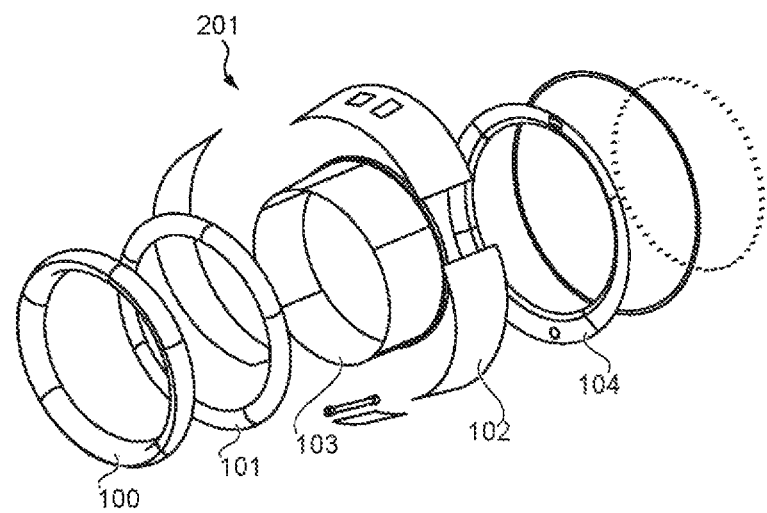
FIG. 3 is a schematic exploded view of a nacelle air inlet as illustrated in FIG. 2.

FIG. 3 is an exploded view of an air inlet 201 of a nacelle 200 of an aircraft propulsion assembly as illustrated in FIG. 2.

The air inlet 201 comprises structural elements such as a front frame 101 and a rear frame 104 and, in a downstream direction in respect of the nacelle 200, a lip 100 carried by the front frame 101, external panels 102 which extend the lip 100 outside the nacelle 200 (and form an external wall of the air inlet), an internal wall 103 which extends the lip inside the nacelle and which delimits a central conduit which enables the air to be channeled in the direction of the motor, the external panels and the internal wall being carried by the front frame 101 and the rear frame 104.

The form of the air inlet and the systems with which it is provided must enable the formation and/or the accumulation of ice or frost to be prevented, enable an aerodynamic function to be ensured, enable the penetration of birds into the blower compartment containing the engine systems to be prevented and enable the impact of noise disruptions to be limited.

Figure 4:
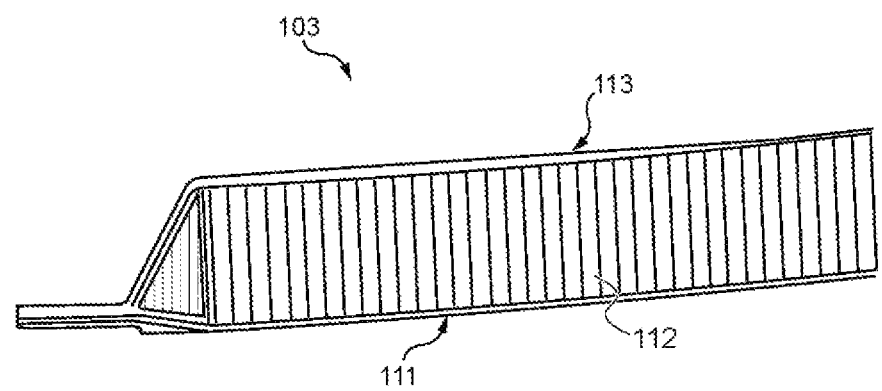
FIG. 4 is a lateral cross section of an acoustic panel of an air inlet as illustrated in FIG. 3.

In order to achieve this last objective, the internal wall 103 is an acoustic panel, illustrated, for example in FIG. 4 in cross section.

The acoustic panel 103 then comprises an alveolar structure as described above, that is, for example:

an "acoustic" or "resistive" skin 111 which is porous, perforated or micro-perforated, and which forms, for example, a visible face of the panel (that is to say, a face which is orientated towards the inner side of the central air inlet conduit); the objective of this resistive skin is to allow sound waves to pass and where applicable also to dissipate at least partially the energy thereof in thermal form, a rear skin 113 which substantially serves to ensure the structural strength of the acoustic panel, and a core 112, at one side and the other of which the resistive skin 111 and the rear skin 113 are fixed, which core contributes both to the mechanical strength and to the sound damping, the main function of the core being to capture and damp the sound waves.

If the acoustic panel is in the zone which is capable of collecting ice or surface runoff, this panel may incorporate a heating element, for example, in the form of a tube or heating wires.

Figure 5:
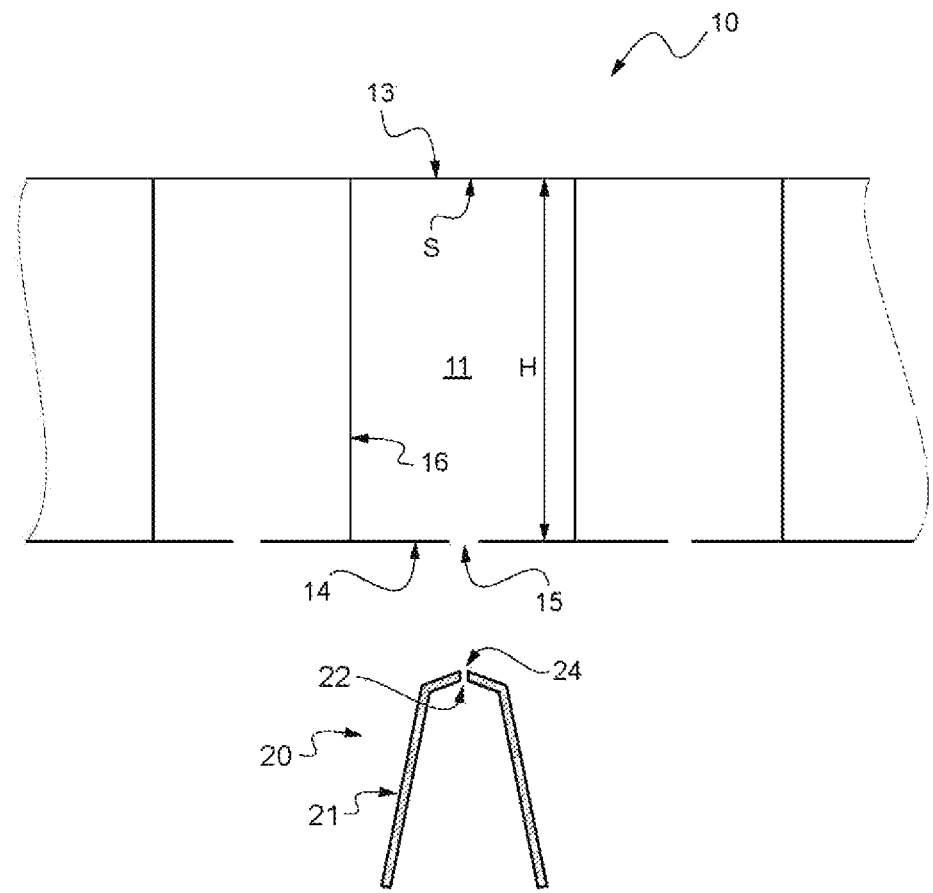
FIG. 5 is a schematic cross section of cells of an alveolar basic structure, for example, as illustrated in FIG. 1, and a diaphragm to be inserted therein in accordance with an embodiment of the invention.

FIG. 5 is a cross section of the cells 11 which enable an alveolar structure 10 which is similar to that of FIG. 1 to be constituted, for example, in order to form a core 112 as illustrated in FIG. 4.

Preferably, the cell 11 is a monobloc cell.

The cells 11 have, in this instance, a hexagonal basic cross section S, such as those of FIG. 1, but they could also have any other shape, in particular an at least partially circular shape. The basic cross section S refers, in this instance, to a cross section of the cell at an end of the cell. Furthermore, by definition in this instance, the cell 11 comprises an internal wall 16.

The cell 11 may be produced from synthetic material, for example, from a thermoplastic matrix, paper or woven material of resin-coated fiber, or of metal or other material in accordance with the application intended.

In this figure, the alveolar structure comprises a perforated membrane 14 which covers the cell 11 at a first side.

The perforated membrane 14 comprises at least one hole 15.

The perforated membrane 14 may also comprise a plurality of holes. For example, the holes are arranged in a regular or random manner.

The perforated membrane 14 may be perforated with at least one hole 15, or a plurality of holes, prior to its installation on the cell 11, or after having been installed, without a hole, on the cell.

The hole 15, or the plurality of holes where applicable, is, for example, placed opposite the cell 11, where applicable centered relative to the cell 11.

The soundproofing structure comprises, in this instance, a closure sheet 13 which covers the cell 11 at a second side.

In this manner, the cell 11 is arranged between the closure sheet 13 and the perforated membrane 14.

The method may thus comprise a step of applying a closure sheet 13 which closes the cell 11 at a second side of the alveolar structure.

The closure sheet 13 may be a solid sheet. However, it may be a sheet which has perforations. A solid sheet is generally used for simple acoustic processing operations, referred to as SDOF ("Single Degree of Freedom"), and forms a rear skin which is configured to reflect sound waves. A perforated closure sheet is generally used for acoustic processing operations, referred to as DDOF ("Double Degree of Freedom"), for which a stack of two levels of honeycomb is produced, the levels being separated by a porous intermediate skin formed by the closure sheet 13.

According to the invention, the alveolar structure 10 is provided with a diaphragm 20, for example, as described below.

The diaphragm 20 is, for example, at least partially produced from metal, thermoplastic material, resin or another material.

The diaphragm 20 may, however, be at least partially produced from elastomer material (for example, from silicone, etc.). The diaphragm 20 may optionally comprise a textile, for example, based on composite material or metal, for example, stainless steel.

It may, for example, be produced by means of injection.

The diaphragm 20 may optionally comprise micro-perforations.

The diaphragm 20 comprises in this instance a membrane 21 which comprises an acoustic outlet 24.

The acoustic outlet 24 is, for example, formed by at least one hole 22, or micro-perforations, for example, or a weave.

In this instance, the hole 22 extends through a thickness of the membrane 21.

Figure 8:
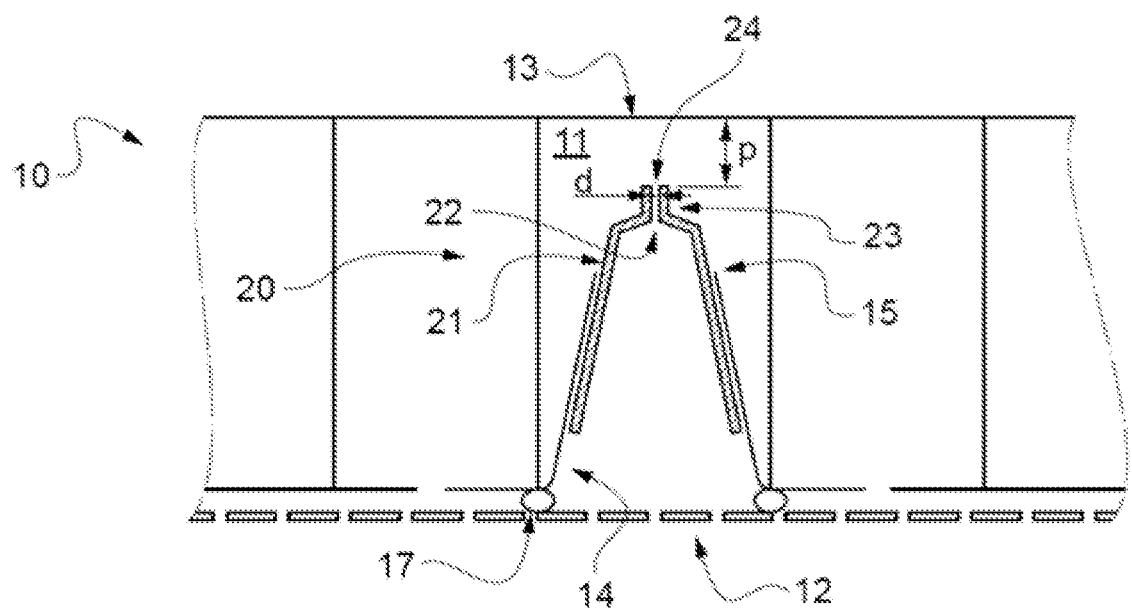
FIG. 8 schematically shows a cell obtained in this manner which enables an alveolar structure to be constituted according to an embodiment of the invention.

According to an option illustrated in FIG. 8, the diaphragm 20 further comprises a tube 23 rising above the hole 22.

If necessary, the tube 23 extends from an edge of the hole 22, so that a diameter of the hole 22 is equal to an inner diameter d of the tube 23.

A tube 23, in this instance, refers to a conduit which has any type of cross section, which may or may not have constant dimensions over the height of the tube, and which forms a protuberance relative to the membrane. It may be cylindrical or frustoconical, with a polygonal or circular cross section.

A polygonal cross section is, for example, hexagonal.

For example, in an alveolar structure with hexagonal cells (conventional honeycomb), the tube has, in particular, a circular or hexagonal cross section.

While in a cell having a cross section other than hexagonal (for example, in an alveolar structure with a flexible core, often called "flexcore"), the tube more particularly has a circular cross section and is rather frustoconical.

The acoustic outlet 24 is then formed by a free end of the tube 23.

In this instance, the membrane 21 comprises a truncated cone which has a wide base and a narrow base and which therefore has a diameter less than a diameter of the large base.

The wide base of the truncated cone is configured to be inscribed in the cross section S of the cell 11.

In this instance, the narrow base comprises the hole 22.

In the embodiment of FIG. 8, the tube 23 extends from the narrow base of the truncated cone.

Figure 6:
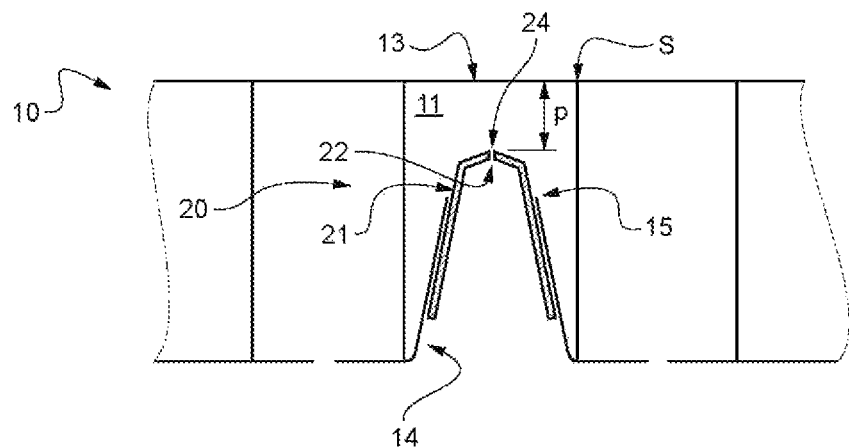
FIG. 6 shows a step of engaging a diaphragm using an insertion tool according to an embodiment of the invention.

In order to position a diaphragm 20 in a cell 11, as illustrated schematically in FIG. 5, at least the acoustic outlet 24, where applicable with a portion of the membrane 21, for example, the narrow base of the truncated cone of the membrane 21, is pressed into the hole 15 of the perforated membrane 14, as illustrated in FIG. 6.

The diaphragm 20 is introduced into the cell 11 by deforming the perforated membrane 14. The hole 15 is then widened by the passage of a portion of the membrane 21.

The acoustic outlet 24 of the diaphragm 20 is initially facing the hole 15 of the perforated membrane 14; in this manner, after the diaphragm 20 is placed in the cell, the diaphragm 20 divides the cell 11 into two compartments which communicate with each other, at least acoustically, via the acoustic outlet 24.

If the diaphragm comprises a tube 23, the tube 23 of the diaphragm 20 is inserted into the hole 15 of the perforated membrane 14. Then, the diaphragm 20 is pressed into the cell 11 while deforming the perforated membrane 14. The hole 15 is then widened by the passage of the tube 23 and also optionally a portion of the membrane 21.

Once in position, the diaphragm 20, and, in particular, at least a portion of the membrane 21, is fixed to the perforated membrane 14.

This fixing can be carried out by means of bonding; for example, at least one of the membrane 21 and the perforated membrane 14 is coated beforehand with adhesive, and/or the perforated membrane 14 may be self-adhesive.

For example, the diaphragm 20 is pressed into the cell 11 until the acoustic outlet 24 is at a distance p from a basic cross section S of the cell 11, where applicable at the side of the closure sheet 13.

This distance p is, for example, determined in accordance with the sound frequencies to be damped.

The distance p is, for example, between 20% and 80% of the height H of the cell relative to the basic cross section S, for example, between 20% and 50%.

The position of the diaphragm 20 in the cell 11 thus depends, in particular, on the geometry of the diaphragm 20 and the perforated membrane 14, and the mechanical properties of the perforated membrane 14.

Figure 7:
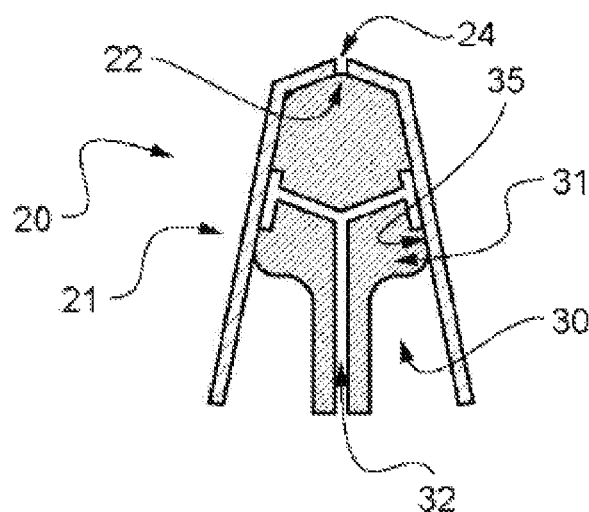
FIG. 7 shows the diaphragm inserted into the cell, according to the embodiment of FIG. 5.

In order to insert the diaphragm 20 into the cell 11, FIG. 7 shows an embodiment of the insertion tool 30 which is configured to insert the diaphragm 20 into the cell 11.

The insertion tool 30 according to an embodiment comprises at least one end-piece 31.

The end-piece 31 is, for example, configured to be inserted into the truncated cone of the membrane 21 of the diaphragm 20 and/or to support the membrane 21 of the diaphragm 20 in order to provide it with a shape which complements that of the end-piece 31.

Externally, the end-piece 31 comprises a lateral wall 35.

In this figure, the external lateral wall 35 of the end-piece 31 of the insertion tool 30 comprises a frustoconical portion, a section of which narrows in the direction of the tip of the insertion tool 30.

The lateral wall 35 of frustoconical form, in this instance, complements the shape of the truncated cone of the membrane 21, but it could have other forms, for example, a spherical form.

The end-piece 31 comprises at least one channel 32 which is configured to be at least placed under reduced pressure.

The channel 32 opens, in this instance, at the frustoconical portion of the external lateral wall 35.

The channel 32 is thus configured to maintain the diaphragm 20 by means of drawing, via a suction cup effect.

To this end, the tool 30 is, for example, connected to a reduced pressure effector (not illustrated). The channel 32 may, however, also be configured to inject compressed air.

This, for example, enables the diaphragm 20 to be released more rapidly or allows adhesion between the diaphragm 20 and the insertion tool 30 to be prevented.

The channel 32 is, for example, selectively placed under reduced pressure or supplied with compressed air in accordance with requirements.

In this manner, in order to retain and position the diaphragm 20 in the cell 11, the insertion tool 30 is configured to take and hold a diaphragm 20 by means of a drawing action and, in particular, a portion of the diaphragm 20, in this instance the membrane 21, using the channel 32 which is placed under reduced pressure, which creates a suction cup effect. The insertion tool 30 pushes the diaphragm 20 into the cell 11 while deforming the perforated membrane 14.

Then, in order to release the diaphragm 20, after it is in position, the reduced pressure in the channel 32 is stopped, or the channel 32 provides slightly compressed air in order to assist in detaching the membrane 21 from the insertion tool 30.

In this manner, before or after the step of fixing the diaphragm 20 to the perforated membrane 14, the method may comprise a step of releasing the diaphragm 20 using the insertion tool 30.

To this end, this step comprises at least one step of stopping the drawing action via the insertion tool 30.

The channel 32 is then, for example, returned to ambient pressure.

And optionally, the method may comprise a step of injecting air via the insertion tool 30, for example, via the channel 32, in order to assist in the detachment of the membrane 21 from the insertion tool 30.

It is then possible to continue the production of the alveolar soundproofing structure, as illustrated, for example, in FIG. 8.

For example, the method then comprises a step of applying a resistive sheet 12 which covers the cells 11, including the diaphragm 20.

For example, the resistive sheet 12 is applied to the first side of the alveolar structure 10.

For example, the resistive sheet 12 is bonded to the perforated membrane 14, for example, by means of adhesive bonding, in particular if the membrane is self-adhesive. If necessary, an adhesive film 17 may be added to the perforated membrane 14, between the perforated membrane 14 and the resistive sheet 12.

The resistive sheet 12 may optionally be perforated. It forms a resistive surface which enables the cells 11 to communicate with an external environment.

The resistive sheet 12 may have a constant thickness, or a three-dimensional structure of variable thickness.

Therefore, if this has not already been done, the method may then comprise a step of applying the closure sheet 13 which closes the cells 11 at the second side of the alveolar structure.

In such an alveolar soundproofing structure, the perforated membrane 14 is thus arranged between the resistive sheet 12 and the closure sheet 13.

According to another embodiment, it is the closure sheet 13 which could, however, be applied to the perforated membrane 14.

The diaphragm 20 thus divides the cell 11 into two compartments which communicate with each other, at least acoustically, only via the acoustic outlet 24, in this instance via the hole 22 or via the tube 23.

The variations of shape and/or dimensions of the cell and/or the diaphragm are thus compensated for by an absorption of force of the diaphragm 20 on the perforated membrane 14.

Such an alveolar structure enables, for example, at least a portion of an acoustic panel 103, for example, as illustrated in FIG. 4, to be constituted, of which an acoustic skin 111 comprises the resistive sheet 12 and a rear skin 113 which is configured to ensure structural strength of the acoustic panel 103 comprises the closure sheet 13.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for producing an alveolar soundproofing structure comprising:
    providing the alveolar structure which comprises at least one cell which has a basic cross section of any shape and a height, and a perforated membrane which comprises at least one hole, the perforated membrane being arranged at a first side of the alveolar structure, covering at least the cell, and the hole opening into the cell;
    providing a diaphragm, comprising a membrane which comprises at least one acoustic outlet;
    providing an insertion tool, comprising an end piece that further comprises an external lateral wall;
    inserting a portion of the membrane including the acoustic outlet into the hole of the perforated membrane with the external lateral wall of the insertion tool contacting a surface of the diaphragm and a step of pressing the diaphragm into the cell with the perforated membrane becoming deformed; and
    a step of fixing the diaphragm to the perforated membrane.

2. The method according to claim 1, further comprising:
    taking the diaphragm using the insertion tool comprising a step of drawing in a portion of the diaphragm using the insertion tool; and
    a step of releasing the diaphragm using the insertion tool comprising a step of stopping the drawing of the portion of the diaphragm using the insertion tool.

3. The method according to claim 2, wherein the step of inserting the portion of the membrane including the acoustic outlet into the hole of the perforated membrane and the step of pressing the diaphragm into the cell while deforming the perforated membrane are carried out by maintaining the drawing action using the insertion tool.

4. The method according to claim 1, further comprising a step of applying a resistive sheet at the first side of the alveolar structure, above the perforated membrane, after the step of pressing the diaphragm into the cell while deforming the perforated membrane.

5. The method according to claim 1, further comprising a step of applying a closure sheet at a second side of the alveolar structure.

6. An aircraft nacelle comprising an air inlet comprising an acoustic panel, the acoustic panel comprising an alveolar soundproofing structure according to claim 1, of which an acoustic skin comprises a resistive sheet and a rear skin which is configured to ensure a structural strength of the acoustic panel comprises a closure sheet.

7. An aircraft comprising at least one propulsion assembly comprising the aircraft nacelle according to claim 6.

8. The method according to claim 1, wherein the end piece of the insertion tool comprises a channel that provides compressed air in order to assist in detaching the membrane from the insertion tool once the diaphragm is fixed to the perforated membrane.

9. An alveolar soundproofing structure comprising:

the alveolar structure which comprises at least one cell which has a basic cross section of any form and a height, and a perforated membrane which covers the cell at a first side and which comprises at least one hole which opens into the cell, a diaphragm which comprises a membrane which has at least one acoustic outlet, at least one portion of the membrane including the acoustic outlet being inserted into the hole of the perforated membrane and the diaphragm being pressed into the cell with an insertion tool that comprises an end piece that further comprises an external lateral wall that contacts a surface of the diaphragm, the membrane of the diaphragm being pressed against and fixed to the perforated membrane, and the hole of the perforated membrane being deformed.

10. The alveolar soundproofing structure according to claim 9, comprising a resistive sheet at the first side of the alveolar structure, above the perforated membrane, the diaphragm being held in the cell at least partially between the perforated membrane and the resistive sheet.

11. The alveolar soundproofing structure according to claim 9, comprising a closure sheet at a second side of the alveolar structure.

* * * * *